United States Patent
Kern (10) Patent No.: US 8,632,411 B1
(45) Date of Patent: Jan. 21, 2014

(54) EXCHANGING VIRTUAL REWARDS FOR COMPUTING RESOURCES

(75) Inventor: Mark Kern, Aliso Viejo, CA (US)

(73) Assignee: Red 5 Studios, Inc., Laguna Hills, CA (US)

( * ) Notice: Subject to any disclaimer, the term of this patent is extended or adjusted under 35 U.S.C. 154(b) by 0 days.

(21) Appl. No.: 13/536,943

(22) Filed: Jun. 28, 2012

(51) Int. Cl.
*A63F 9/24* (2006.01)
*G06F 17/00* (2006.01)

(52) U.S. Cl.
USPC .............. 463/42; 705/14.11; 705/14.12

(58) Field of Classification Search
USPC ............... 463/42; 705/14.11, 14.12
See application file for complete search history.

(56) References Cited

U.S. PATENT DOCUMENTS

| | | | |
|---|---|---|---|
| 5,371,852 A | 12/1994 | Attanasio et al. | |
| 5,384,910 A | 1/1995 | Torres | |
| 5,943,052 A | 8/1999 | Allen et al. | |
| 6,067,545 A | 5/2000 | Wolff | |
| 6,330,605 B1 | 12/2001 | Christensen et al. | |
| 6,374,336 B1 | 4/2002 | Peters et al. | |
| 6,380,933 B1 | 4/2002 | Sharir et al. | |
| 6,434,398 B1 | 8/2002 | Inselberg | |
| 6,456,304 B1 | 9/2002 | Angiulo et al. | |
| 6,466,275 B1 | 10/2002 | Honey et al. | |
| 6,561,811 B2 | 5/2003 | Rapoza et al. | |
| 6,571,216 B1 * | 5/2003 | Garg et al. | 705/14.25 |
| 6,597,375 B1 | 7/2003 | Yawitz | |
| 6,629,129 B1 | 9/2003 | Bookspan et al. | |
| 6,699,127 B1 | 3/2004 | Lobb et al. | |
| 6,760,042 B2 | 7/2004 | Zetts | |
| 6,760,595 B2 | 7/2004 | Inselberg | |
| 6,772,195 B1 | 8/2004 | Hatlelid et al. | |
| 6,864,886 B1 | 3/2005 | Cavallaro et al. | |
| 6,928,485 B1 | 8/2005 | Krishnamurthy et al. | |
| 6,996,413 B2 | 2/2006 | Inselberg | |
| 6,999,083 B2 | 2/2006 | Wong et al. | |
| 7,075,556 B1 | 7/2006 | Meier et al. | |
| 7,133,051 B2 | 11/2006 | Sloo et al. | |
| 7,219,160 B1 | 5/2007 | Buchsbaum et al. | |
| 7,350,158 B2 | 3/2008 | Yamaguchi et al. | |
| 7,390,254 B2 | 6/2008 | Hirai | |

(Continued)

FOREIGN PATENT DOCUMENTS

| DE | 102005034692 | 2/2007 |
|---|---|---|
| EP | 1879381 | 1/2008 |

(Continued)

OTHER PUBLICATIONS

"CPUsage wants to harness idle computer power for others to use" written by D.K. Row, available on or before Jul. 2012 and retrieved from URL <http://www.oregonlive.com/small-business/index.ssf/2012/07/cpusage_wants_to_harness_idle.html>, 3 pages.*

(Continued)

*Primary Examiner* — William Brewster
*Assistant Examiner* — Jason Skaarup
(74) *Attorney, Agent, or Firm* — Carr & Ferrell LLP (57) ABSTRACT

Systems and methods for exchanging virtual rewards for computing resources are provided herein. Exemplary methods may include receiving access to a portion of computing resources of an end user computing system and providing a virtual reward within a networked gaming environment to an end user in exchange for utilizing an amount of the portion of the computing resources of the end user computing system.

17 Claims, 5 Drawing Sheets

(56) References Cited

U.S. PATENT DOCUMENTS

| | | | |
|---|---|---|---|
| 7,458,894 B2 | 12/2008 | Danieli et al. | |
| 7,490,314 B2 | 2/2009 | Yuknewicz et al. | |
| 7,492,363 B2 | 2/2009 | Meier et al. | |
| 7,506,318 B1 | 3/2009 | Lindo et al. | |
| 7,632,186 B2 | 12/2009 | Spanton et al. | |
| 7,719,971 B1 | 5/2010 | Issa | |
| 7,729,992 B2* | 6/2010 | Rose | 705/51 |
| 7,844,301 B2 | 11/2010 | Lee et al. | |
| 7,890,701 B2 | 2/2011 | Lowery et al. | |
| 7,917,632 B2 | 3/2011 | Lee et al. | |
| 7,970,820 B1 | 6/2011 | Sivasubramanian et al. | |
| 8,001,063 B2* | 8/2011 | Tesauro et al. | 706/12 |
| 8,025,569 B2 | 9/2011 | Nguyen et al. | |
| 8,025,572 B2 | 9/2011 | Spanton et al. | |
| 8,128,469 B2 | 3/2012 | Hormigo Cebolla et al. | |
| 8,128,503 B1 | 3/2012 | Haot et al. | |
| 8,130,747 B2 | 3/2012 | Li et al. | |
| 8,235,817 B2 | 8/2012 | Zalewski | |
| 2001/0036356 A1 | 11/2001 | Weaver et al. | |
| 2001/0055991 A1 | 12/2001 | Hightower | |
| 2002/0002074 A1 | 1/2002 | White et al. | |
| 2002/0032056 A1 | 3/2002 | Oh | |
| 2002/0097984 A1 | 7/2002 | Abecassis | |
| 2002/0183115 A1 | 12/2002 | Takahashi et al. | |
| 2002/0198769 A1* | 12/2002 | Ratcliff, III | 705/14 |
| 2003/0038805 A1 | 2/2003 | Wong et al. | |
| 2003/0084462 A1 | 5/2003 | Kubota et al. | |
| 2003/0220143 A1 | 11/2003 | Shteyn et al. | |
| 2004/0087363 A1 | 5/2004 | Bogenn | |
| 2004/0116183 A1 | 6/2004 | Prindle | |
| 2004/0153569 A1 | 8/2004 | Savathphoune | |
| 2004/0192354 A1* | 9/2004 | Sawano | 455/457 |
| 2004/0248631 A1 | 12/2004 | Hirai | |
| 2004/0259627 A1 | 12/2004 | Walker et al. | |
| 2005/0020359 A1 | 1/2005 | Ackley et al. | |
| 2005/0071736 A1 | 3/2005 | Schneider et al. | |
| 2005/0091597 A1 | 4/2005 | Ackley | |
| 2005/0227771 A1 | 10/2005 | Nelson et al. | |
| 2006/0058103 A1 | 3/2006 | Danieli et al. | |
| 2006/0098013 A1 | 5/2006 | Wong et al. | |
| 2006/0170778 A1 | 8/2006 | Ely et al. | |
| 2006/0206565 A1 | 9/2006 | Ganesan et al. | |
| 2006/0258446 A1 | 11/2006 | Nguyen et al. | |
| 2007/0055694 A1 | 3/2007 | Ruge et al. | |
| 2007/0063995 A1 | 3/2007 | Bailey et al. | |
| 2007/0117617 A1 | 5/2007 | Spanton et al. | |
| 2007/0117635 A1 | 5/2007 | Spanton et al. | |
| 2007/0250901 A1 | 10/2007 | McIntire et al. | |
| 2007/0256030 A1 | 11/2007 | Bedingfield, Sr. | |
| 2007/0298878 A1 | 12/2007 | Short | |
| 2008/0026839 A1 | 1/2008 | Alringer | |
| 2008/0052384 A1 | 2/2008 | Marl et al. | |
| 2008/0119286 A1 | 5/2008 | Brunstetter et al. | |
| 2008/0125226 A1 | 5/2008 | Emmerson | |
| 2008/0126357 A1 | 5/2008 | Casanova et al. | |
| 2008/0146339 A1 | 6/2008 | Olsen et al. | |
| 2008/0146342 A1 | 6/2008 | Harvey et al. | |
| 2009/0005196 A1 | 1/2009 | Kessler et al. | |
| 2009/0017750 A1* | 1/2009 | Marcinkiewicz | 455/3.05 |
| 2009/0031227 A1 | 1/2009 | Chakrabarti et al. | |
| 2009/0044113 A1 | 2/2009 | Jones et al. | |
| 2009/0083662 A1 | 3/2009 | Fitzmaurice et al. | |
| 2009/0083665 A1 | 3/2009 | Anttila et al. | |
| 2009/0100366 A1 | 4/2009 | Fitzmaurice et al. | |
| 2009/0118017 A1 | 5/2009 | Perlman et al. | |
| 2009/0118018 A1 | 5/2009 | Perlman et al. | |
| 2009/0118019 A1 | 5/2009 | Perlman et al. | |
| 2009/0118020 A1 | 5/2009 | Koivisto et al. | |
| 2009/0124387 A1 | 5/2009 | Perlman et al. | |
| 2009/0144380 A1 | 6/2009 | Kallman et al. | |
| 2009/0172171 A1 | 7/2009 | Amir | |
| 2009/0208181 A1 | 8/2009 | Cottrell | |
| 2009/0215531 A1 | 8/2009 | Perlman et al. | |
| 2009/0215540 A1 | 8/2009 | Perlman et al. | |
| 2009/0249189 A1 | 10/2009 | Jania et al. | |
| 2009/0254998 A1* | 10/2009 | Wilson | 726/27 |
| 2009/0265473 A1 | 10/2009 | Hydrie et al. | |
| 2009/0290753 A1 | 11/2009 | Liu et al. | |
| 2009/0297118 A1 | 12/2009 | Fink et al. | |
| 2009/0326970 A1 | 12/2009 | Estrada et al. | |
| 2010/0014825 A1 | 1/2010 | Curtis et al. | |
| 2010/0031333 A1 | 2/2010 | Mitchell et al. | |
| 2010/0041475 A1 | 2/2010 | Zalewski et al. | |
| 2010/0064008 A1 | 3/2010 | Yan et al. | |
| 2010/0100849 A1 | 4/2010 | Fram | |
| 2010/0150120 A1* | 6/2010 | Schlicht et al. | 370/338 |
| 2010/0154050 A1 | 6/2010 | Mukkara et al. | |
| 2010/0167809 A1 | 7/2010 | Perlman et al. | |
| 2010/0167816 A1 | 7/2010 | Perlman et al. | |
| 2010/0169964 A1 | 7/2010 | Liu et al. | |
| 2010/0174782 A1* | 7/2010 | Rose | 709/204 |
| 2010/0281095 A1* | 11/2010 | Wehner et al. | 709/201 |
| 2010/0281432 A1 | 11/2010 | Geisner et al. | |
| 2011/0013087 A1 | 1/2011 | House et al. | |
| 2011/0028194 A1 | 2/2011 | Tang et al. | |
| 2011/0029932 A1 | 2/2011 | McKaskle et al. | |
| 2011/0055222 A1 | 3/2011 | Choudur et al. | |
| 2011/0059818 A1 | 3/2011 | Blais et al. | |
| 2011/0093600 A1 | 4/2011 | Lee et al. | |
| 2011/0105226 A1 | 5/2011 | Perlman | |
| 2011/0111854 A1 | 5/2011 | Roberts et al. | |
| 2011/0145880 A1 | 6/2011 | Wang | |
| 2011/0151971 A1 | 6/2011 | Altshuler et al. | |
| 2011/0161666 A1 | 6/2011 | Gladwin et al. | |
| 2011/0202562 A1 | 8/2011 | Bloch et al. | |
| 2011/0238618 A1 | 9/2011 | Valdiserri et al. | |
| 2011/0263333 A1 | 10/2011 | Dokei et al. | |
| 2011/0275431 A1 | 11/2011 | Hirzel et al. | |
| 2011/0295666 A1 | 12/2011 | Musial et al. | |
| 2012/0054002 A1 | 3/2012 | Rotbard et al. | |
| 2012/0054685 A1 | 3/2012 | Su et al. | |
| 2012/0130863 A1 | 5/2012 | Tedjamulia et al. | |
| 2012/0142433 A1 | 6/2012 | Perlman et al. | |
| 2012/0149476 A1 | 6/2012 | Perlman et al. | |
| 2012/0151346 A1 | 6/2012 | McClements, IV | |
| 2012/0151347 A1 | 6/2012 | McClements, IV | |
| 2012/0204107 A1 | 8/2012 | Salinas | |
| 2012/0311624 A1 | 12/2012 | Oskolkov et al. | |
| 2013/0084970 A1 | 4/2013 | Geisner et al. | |

FOREIGN PATENT DOCUMENTS

| | | | | |
|---|---|---|---|---|
| JP | 2004362149 A | * | 12/2004 | G06F 17/60 |
| WO | 9712342 | | 4/1997 | |
| WO | 2006076075 | | 7/2006 | |

OTHER PUBLICATIONS

"CPUsage: Let Your PC Earn Money for You" written by Lambert Varias, available on or before Aug. 26, 2011 and retrieved from URL <http://technabob.com/blog/2011/08/26/cpusage-make-money-with-your-pc/>, 3 pages.*

"Need cash? Forget plasma, and donate CPU time instead" written by Stacey Higginbotham, available on or before Jul. 11, 2011 and retrieved from URL <http://gigaom.com/cloud/need-cash-forget-plasma-and-donate-cpu-time-instead/>, pages.*

"Info on Points and Redemption" written by Jeff Martens, available on or before Jul. 20, 2011 and retrieved from URL <http://www.cpusage.com/blog/computer-owners/info-on-points-and-redemption/>, 1 page.*

Abd El-Sattar. A Novel Interactive Computer-Based Game Framework: From Design to Implementation. 2008 International Conference Visualisation [Online] 2008, pp. 123-128.

Blevins. Neverwinter Nights—PC Review at IGN—p. 2. http://pc.ign.com/articles/363/363038p2.html (accessed Aug. 12, 2011).

Haynes. Dead Space Review—Xbox 360 Review at IGN—pp. 2 & 3. http://xbox360.ign.com/articles/918/918892p2.html & http://xbox360.ign.com/articles/918/918892p3.html (accessed Aug. 12, 2011).

Hernandez et al. WeSketch: A 3D Real Time Collaborative Virtual Environment that Improves the GUI Sketching Task. 2011 Eighth International Conference on Information Technology: New Generations [Online] 2011.

(56) References Cited

OTHER PUBLICATIONS

Raskin. Graph Plus. PC Magazine [Online] Oct. 17, 1989. V8, N17, p. 102(3).
Rowe et al. A Framework for Narrative Adaptation in Interactive Story-Based Learning Environments. Proceedings of the Intelligent Narrative Technologies III Workshop [Online] 2010.
Ludwig et al., "XEP-0166: Jingle," XMPP Standards Foundation. pp. 1-53. Dec. 23, 2009.
Rosenberg, "Interactive Connectivity Establishment (ICE): A Protocol for Network Address Translator (NAT) Traversal for Offer/Answer Protocols," Internet Engineering Task Force (IETF). pp. 1-117, Apr. 2010.
Zhou et al., "A Method of View-Frustum Culling with OBB Based on Octree," IET Conference on Wireless, Mobile and Sensor Networks 2007, pp. 680-682, Jan. 1, 2007. XP55023509.
World of Warcraft Gold, Anything About WOW, Apr. 23, 2007. retrieved from the internet: http://wowgolds.wordpress.com/2007/04/23/how-to-take-and-make-screenshots/ (accessed on Mar. 30, 2012) XP002672710.
Extended European Search Report with mail date of Mar. 30, 2012, re European Application No. 12151200.8 filed Jan. 16, 2012.
"Algemagorgic Non-Modal Context Menu," CodeGuru, May 22, 2004. retrieved from the internet: http://forums.codeguru.com/showthread.php?t=295801 (accessed on Apr. 27, 2012) XP002675225.
"Context Menu," Wikipedi, the free encyclopedia, Jun. 16, 2010. retrieved from the internet: http://en.wikipedia.org/w/index.php?title=Context_menu&oldid=368337587 (accessed on May 3, 2012) XP002675226.
"Maptool Concepts: The Next UI, Look, and Feel," RPTools.net, Feb. 2010. retrieved from the internet: http://forums.rptools.net/viewtopic.php?f=7&t=13178&sid=107ad2f90d833d6b5669fbeO3587b091&start=45 (accessed May 3, 2012) XP002675227.
"Pie Menu," Wikipedia, the free encyclopedia, Jul. 5, 2010. retrieved from the internet: http://en.wikipedia.org/w/index.php?title=Pie_menu&oldid=371797903 (accessed May 3, 2012) XP002675228.
"Modal Window," Wikipedia, the free encyclopedia, Aug. 18, 2010. retrieved from the internet: http://en.wikipedia.org/w/index.php?title=Modal_window&oldid=379626221 (accessed on May 3, 2012) XP002675229.
Extended European Search Report with mail date of May 4, 2012, re European Application No. 11006996.0 filed Aug. 26, 2011.
"CPUsage wants to harness idle computer power for others to use" written by O.K. Row, available on or before Jul. 2012 and retrieved from URL <http://www.oregonlive.com/small-business/index.ssf/2012/07/cpusage_wants_to_harness_idle.html>, 3 pages.
"Need cash? Forget plasma, and donate CPU time instead" written by Stacey Higginbotham, available on or before Jul. 11, 2011 and retrieved from URL <http://gigaom.com/cloud/need-cash-forget-plasma-and-donate-cpu-time-instead/>.
"Info on Points and Redemption" written by Jeff Martens, available on or before Jul. 20,2011 and retrieved from URL<http://www.cpusage.com/blog/computer-owners/info-on-points-and-redemption/>, 1 page.

"Apr./May 2011 Admin Requirement Application—Europe." 13d.net. Online. Apr. 24, 2011. Accessed via the Internet Accessed Nov. 8, 2012. <URL: http://forum.i3d.net/battlefield-heroes-ranked-community-servers/170034-apr-may-2011-admin-requirement-application-europe.html#post1270013>.
BlamDarot, "Achievement Screenshotter", World of Warcraft Mod, Created Jul. 3, 2009, Last Updated Nov. 4, 2010, description accessed at http://wow.curseforge.com/addons/achievement-screenshotter on Feb. 15, 2013.
Rytych, "Game-like environments for nuclear engineering education using GECK", 1st International Nuclear & Renewable Energy Conference (INREC), pp. 1-5, IEEE, Mar. 2010.
Extended European Search Report with mail date of Dec. 3, 2012, re European Application No. 12170191.6 filed May 31, 2012.
Zhang, J. et al "WindTalker: A P2P-Based Low-Latency Anonymouns Communication Network," IEICE Transactions on Communications, Communications Society, Tokyo, JP, vol. E92B, No. 10, Oct. 1, 2009, pp. 3183-3194.
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
"Neverwinter Nights Platinum". Game Manual. Copyright 2004, Atari Interactive, Inc. 114 pages.
"Horse menu". Neverwinter Nights Wiki page. Http://nwnwikia.com/wiki/Horse_menu. 2 pages.
"Counter Strike Manual" published on or before May 15, 2006, and retrieved from URL <http://web.archive.org/web/20060515161034/http://voidclan.tripod.com/csmanual.htm>, 17 pages.
"Spectator FAQ" published on or before Nov. 11, 2011 and retrieved from URL <http://web.archive.org/web/20111110125011/http://na.leagueoflegends.com/spectator-faq>, 4 pages.
"Killcam Description for Call of Duty" published on or before Nov. 11, 2011 and retrieved from URL <http://web.archive.org/web20111126172904/http:/callofduty.wikia.com/wiki/Kilcam>, 7 pages.
"Counter-Strike" game description published on or before Nov. 21, 2010 and retrieved from URL <http://web.archive.org/web/20101121144545/http://en.wikipedia.org/wiki/Counter-Strike>, 6 pages.
"Official Rules of Baseball—2011 Edition". Major League Baseball. Feb. 16, 2011. Retrieved from the internet. Retrieved Jun. 1, 2013. <URL:http://web.archive.org/web/20120112040330/http://mlb.mlb.com/mlb/official_info/official_rules/foreword.jsp>.
Murph, Darren. "Editorial: ESPN bypasses corporate red tape with iPad and Xbox 360, wannabe innovators should take note" Jun. 12, 2010. <http://www.engadget.com/2010/06/12/editorial-espn-bypasses-corporate-red-tape-with-ipad-and-xbox-3/>.
Point-HD Telestrator with Ipad. <http://www.hdtelestrators.com/Ipad%20Telestrator.html>.
Bloviator, "America's Army Training Guide", www.gamefaqs.com, Online, Mar. 24, 2008, Accessed via the Internet Sep. 13, 2013, <URL: http://www.gamefaqs.com/pc/561551-americas-army/faqs/45333>.

\* cited by examiner

EXCHANGING VIRTUAL REWARDS FOR COMPUTING RESOURCES

CROSS REFERENCE TO RELATED APPLICATIONS

This non-provisional patent application relates to U.S. patent application Ser. No. 13/191,321, filed on Jul. 26, 2011, entitled "Systems and Methods of Distributed File Storage," which is hereby incorporated by reference herein in its entirety.

FIELD OF THE INVENTION

The present technology relates generally to the exchanging of virtual rewards for computing resources, and more specifically, but not by way of limitation, to the provisioning of virtual rewards within a networked gaming environment in exchange for the computing resources (e.g., processing, memory, bandwidth, and so forth) of an end use computing system.

BACKGROUND

Virtual rewards within gaming environments are ubiquitous. These virtual rewards may be provided to the end user in exchange for actions conducted within the gaming environment or the purchase of game related products that are either intrinsic or extrinsic to the gaming environment. The composition of virtual rewards may depend upon the type of game played. For example, in a first-person shooter game a virtual reward may include weaponry, currency, health, and experience—just to name a few. Additionally, the type of virtual rewards provided within a gaming environment may depend on the design preferences of game designers or the demands of end users (e.g., gamers).

Additionally, gaming environments, especially networked gaming environments, such as a MMORPGs (massively multiplayer online role-playing games) require and consume a large amount of computing resources in order to facilitate game play. In contrast, the computing resources of end user computing systems used to play these online games may frequently be unused or underutilized. If dedicated back to the networked gaming system that is utilized to facilitate the networked gaming environment, these dedicated computing resources of end user computing systems may be utilized to reduce the operating expenses associated with the networked gaming system. End user computing systems may form a distributed computing environment that provides computing resources to the networked gaming system. To incentivize participation and dedication of computing resources, virtual rewards may be provided to the end user within the networked gaming environment. These and other advantages of the present technology will be described in greater detail herein.

SUMMARY OF THE INVENTION

According to some embodiments, the present technology may be directed to methods for exchanging virtual rewards for computing resources. These methods may comprise: (a) receiving access to a portion of computing resources of an end user computing system; and (b) providing a virtual reward within a networked gaming environment to an end user in exchange for utilizing an amount of the portion of the computing resources of the end user computing system.

According to other embodiments, the present technology may be directed to methods for exchanging virtual rewards for computing resources. These methods may comprise: (a) monitoring an amount of computing resources of an end user computing system utilized by a networked gaming environment over a given period of time; and (b) providing a virtual reward to an end user within the networked gaming environment when the amount of computing resources of the end user computing system utilized by the networked gaming environment over the given period of time exceeds a threshold value.

According to additional embodiments, the present technology may be directed to an online gaming system that facilitates a networked gaming environment. The online gaming system may comprise: (a) at least one server that is selectively coupleable to an end user computing system, the at least one server comprising a processor configured to execute instructions that comprise: (i) a resource manager that receives access to a portion of computing resources of an end user computing system for use in the networked gaming environment; and (ii) a reward module that provides a virtual reward within the networked gaming environment to an end user in exchange for an amount of the portion of the computing resources of the end user computing system that is utilized to facilitate operation of the networked gaming environment.

DETAILED DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Generally speaking, the present technology may be configured to exchange virtual rewards for computing resources within the context of a networked gaming system. The networked gaming system may be implemented as a server-based or cloud-based gaming system that facilitates a networked gaming environment. An exemplary networked gaming environment may include an MMORPG, first-person shooter, or other networked program. As mentioned above, the implementation of these networked gaming environments requires a large amount of computational resources, such as processing capacity, memory, storage, network bandwidth, and so forth. As the complexity of the gaming environment increases and the number of end users increases, the computing resources necessary to facilitate game play must scale accordingly. Thus, the cost to administer the gaming environment also scales upwardly. Often times, these costs are passed onto the end user in the form of increased access fees and/or costly in-game products and services.

The present technology alleviates these drawbacks by allowing for the provision of virtual rewards within a gaming environment in exchange for an end user allowing the networked gaming system to utilize at least a portion of the computing resources of the end user computing system. The computing resources provided to the networked gaming system may include processing capacity, network bandwidth, storage space, and other computing resources that would be known to one of ordinary skill in the art with the present disclosure before them.

The virtual rewards that are provided to the end user may be provided within the networked gaming environment (e.g., videogame). The content of the virtual rewards may depend upon the subject matter of the gaming environment (e.g., type of videogame), preferences of game designers, demands of the end users, and so forth. Exemplary virtual rewards may include, but are not limited to, virtual currency, virtual items, gaming points, prioritized access to the networked gaming environment, or any combinations thereof. One of ordinary skill in the art will appreciate the limitless number of virtual rewards types that may be contemplated for use within a gaming environment.

Figure 1:
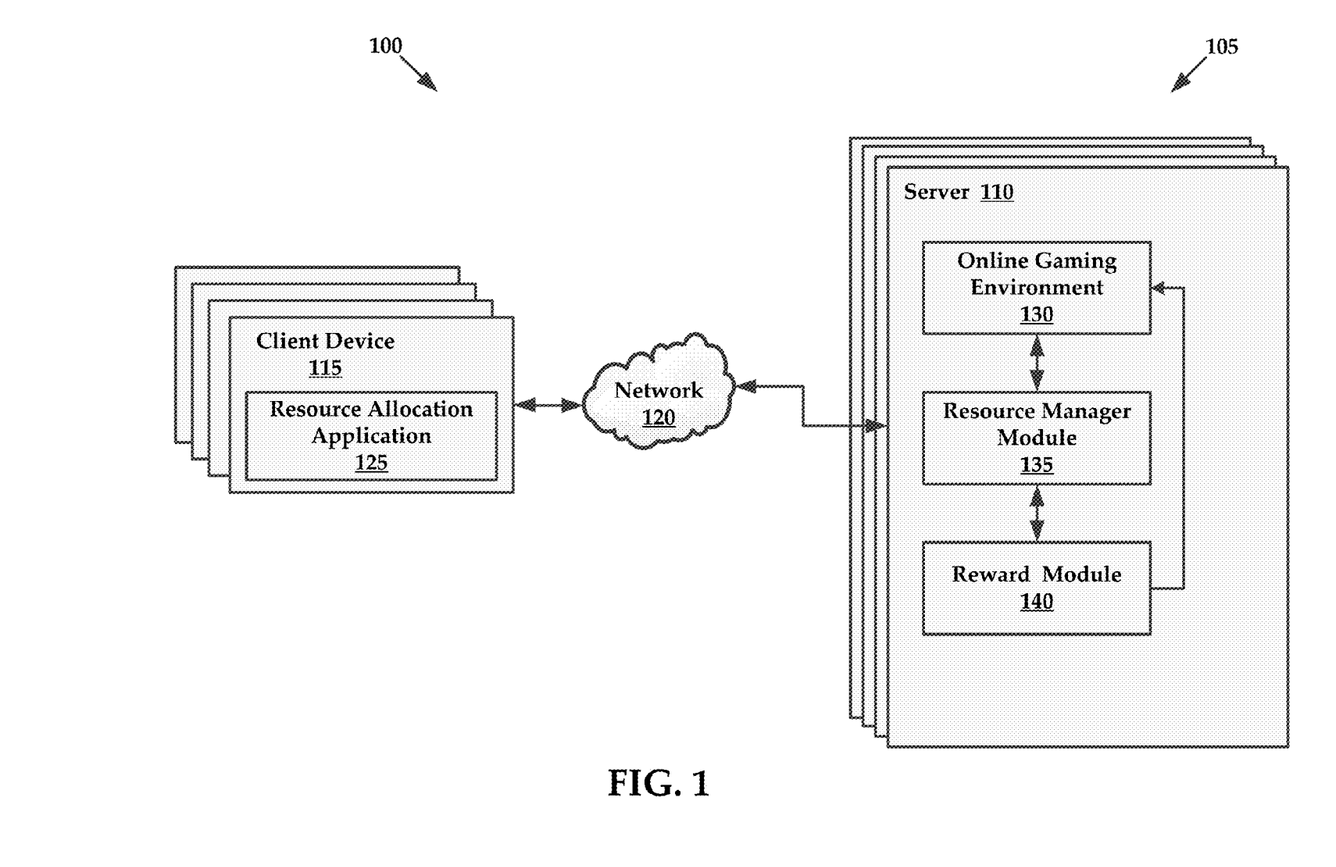
FIG. 1 illustrates an exemplary architecture for practicing aspects of the present technology.

FIG. 1 illustrates an exemplary architecture 100 for practicing aspects of the present technology. The architecture 100 is shown as including a networked gaming system 105 implemented within the context of a server 110 (shown within a plurality of web servers). The networked gaming system 105 may facilitate the operation of a networked gaming environment 130.

An end user computing system 115 (shown within a plurality of end user computing systems) may be communicatively coupled to the server 110 via a network connection 120. It will be understood that the network connection 120 may include any private or public network such as the Internet.

When the end user computing system 115 is communicatively coupled to the server 110, the end user computing system 115 may allocate at least a portion of its computing resources to the server 110 (and in turn the networked gaming system 105) in exchange for one or more virtual rewards. In some instances when each of a plurality of end user computing systems have dedicated a portion of their resources to the server 110, the end user computing systems behave as a cloud-based computing environment or distributed computing system.

In general, a cloud-based computing environment is a resource that combines the computational power of a large grouping of processors and/or that combines the storage capacity of a large grouping of computer memories or storage devices. For example, systems that provide a cloud resource may be utilized exclusively by their owners. These systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the networked gaming system 105 may be generally described as a particular purpose computing environment that includes executable instructions stored in memory. These instructions, when executed by the processor exchange virtual rewards for computing resources. Advantageously, these virtual rewards may be provisioned within the networked gaming environment 130. The networked gaming system 105 may receive access to a portion of computing resources of an end user computing system and provide a virtual reward within a networked gaming environment to an end user in exchange for utilizing an amount of the portion of the computing resources of the end user computing system.

In some embodiments, the networked gaming system 105 may exchange virtual rewards for computing resources by monitoring an amount of computing resources of an end user computing system utilized by a networked gaming environment over a given period of time. Moreover, the networked gaming system 105 may provide a virtual reward to an end user within the networked gaming environment when the amount of computing resources of the end user computing system utilized by the networked gaming environment over the given period of time exceeds a threshold value.

According to some embodiments, the end user computing system 115 may allocate a portion of its resources to the networked gaming system 105 in a manner that is transparent to the end user. That is, the end user may authorize the networked gaming system 105 to utilize a portion of the computing resources of the end user computing system 115. The end user may also establish a usage period (e.g., a timeframe) for when these computing resources may be allocated. Once these parameters have been established, the networked gaming system 105 may utilize the computing resources without further involvement of the end user.

In other embodiments, the end user computing system 115 may comprise a resource allocation application 125 that is configured to allow end users of the end user computing system 115 to specify the amount and type of computing resources that are to be allocated to networked gaming system 105. The resource allocation application 125 may be configured to run inconspicuously (for example, in the system tray of the operating system) to the end user when the end user is not interacting with the resource allocation application 125, so as to be unobtrusive to the end user. Additionally, the resource allocation application 125 may be configured to generate graphical user interfaces that allow end users to configure the operating parameters of the resource allocation application 125. For example, the end user may utilize the resource allocation application 125 to specify which computing resources of the end user computing system 115 are to be allocated to the networked gaming system 105.

The end user may also selectively determine the times at which specified computing resources are allocated. For example, the end user may choose to allocate computing resources only when the user is not utilizing the end user computing system 115 (e.g., when the end user has logged out of the end user computing system, or when the end user computing system goes into screensaver mode). In other embodiments, the end user may allocate computing resources even when the end user is currently utilizing the end user computing system 115 and even when the end user is interacting with the networked gaming environment 130.

The resource allocation application 125 may provide allocated resource data to the networked gaming system 105 to indicate that allocated resources are available for use by the networked gaming system 105. The resource allocation application 125 may provide the end user with resource utilization data that corresponds to the amount of distributed resources of the end user computing system 115 that are currently being utilized by the networked gaming system 105. In some embodiments, the resource allocation application 125 may display an aggregate amount of resources that have been utilized by the networked gaming system 105 within a given period of time.

According to some embodiments, the networked gaming system 105 may include executable instructions for exchanging virtual rewards for the computing resources of the end user computing system 115. In some embodiments, the executable instructions may reside on the server 110 and may include a resource manager module 135 and a reward module 140. It is noteworthy that the server 110 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

An additional consideration is the actual availability of the distributed resources of the end user computing system 115. For example, while the end user computing system 115 allocates computing resources to the networked gaming system 105, the end user computing system 115 may rarely be communicatively coupled to the networked gaming system 105 (typically through a front end server such as server 110). As such, the resource manager module 135 may be configured to evaluate not only the available computing resource allocation from the end user computing system 115, but also determine the actual availability of the computing resources of the end user computing system 115. This availability may include immediate/current availability or an analysis of the availability of the allocated computing resources over a given period of time.

For example, the resource allocation application 125 of the end user computing system 115 may specify an amount of allocated computing resources such as a certain percentage of CPU processing availability. In reality, the resource manager module 135 may determine that the CPU processing resources of the end user computing system 115 are rarely available. For example, the end user computing system 115 may be offline a considerable amount of time, or may be online only during off-peak periods (e.g., times when the workload of the networked gaming system is inherently low). Based upon the actual resource allocation data determined by the resource manager module 135, the reward module 140 may selectively vary the virtual rewards that are provided to the end user.

In some instances, virtual rewards may be provided to the end user upon the dedication of computing resources to the networked gaming system 105. That is, the end user may not be negatively affected by the fact that the networked gaming system 105 has not actually used the allocated resources.

According to some embodiments, the computing resources that are allocated by the end user computing system 115 may comprise any of processing, network bandwidth, or any combinations thereof. Additional types of computing resources that would be known to one of ordinary skill in the art are likewise contemplated for use in accordance with the present technology.

The resource manager module 135 may also be configured to calculate, over a period of time, a total amount of computing resources of the end user computing system utilized by the networked gaming environment 130. Based upon this calculation, the reward module 140 may select one or more virtual rewards based upon the total amount of the computing resources of the end user computing system utilized by the networked gaming environment 130. To incentivize end users to dedicate their computing resources to the networked gaming environment 130 the reward module 140 may be configured to provide virtual rewards of greater value (or amount) based upon the amount of computing resources that are allocated and/or utilized by the networked gaming environment 130. Thus, the reward module 140 may provision rare or "expensive" items to end users that dedicate a desirable amount of computing resources.

In some instances, the value of the virtual rewards may increase as additional portions of the computing resources are dedicated and utilized. For example, larger amounts of virtual currency may be provided to the end user as the end user dedicates additional computing resources. An end user that allocates 5% of their processing capacity may receive a first amount of virtual currency, while another end user that allocates 8% of their processing capacity may receive a second amount of virtual currency that is greater than the first amount of virtual currency.

In some instances, the reward module 140 may provide different virtual rewards to end users based upon the type of computing resource that has been allocated/utilized. For example, more valuable virtual rewards may be provided to end users that dedicated processing capacity relative to end users that only dedicate network bandwidth.

Additionally, the reward module 140 may provide a virtual reward that is based upon an operating period during which access to the computing resources has been allocated/utilized. For example, if an end user allocates computing resources during peak operating hours for the networked gaming environment 130, the virtual reward that is provided by the reward module 140 may be of greater value relative to a virtual reward provided to an end user that allocates computing resources during an off-peak time.

It will be understood that the virtual rewards that are provided to the end user may be provisioned by the reward module 140 within the context of the networked gaming environment 130. As mentioned briefly above, the reward module 140 may provide an almost limitless variety of virtual rewards to the end user. For example, virtual rewards may comprise any of virtual currency, virtual items, gaming points, prioritized access to the networked gaming environment, or any combinations thereof. In particular, virtual items may comprise, but are not limited to, virtual pets, experience points, health points, inventory, armor, weapons, clothing, unlocking codes, cheat codes, hidden game features, and so forth.

The networked gaming environment 130 may provide a dashboard that provides an end user with visual indicators that inform the end user of various metrics. These metrics may comprise dedicated/allocated computing resources, current utilization of allocated computing resources, utilization of allocated computing resources over a given period of time, virtual rewards that have been received, and so forth. For example, the dashboard may comprise a visual indication of the amount of the portion of the computing resources of the end user computing system that are being utilized. In further embodiments the dashboard may comprise a visual indication that virtual rewards have been provided to the end user.

Figure 3:
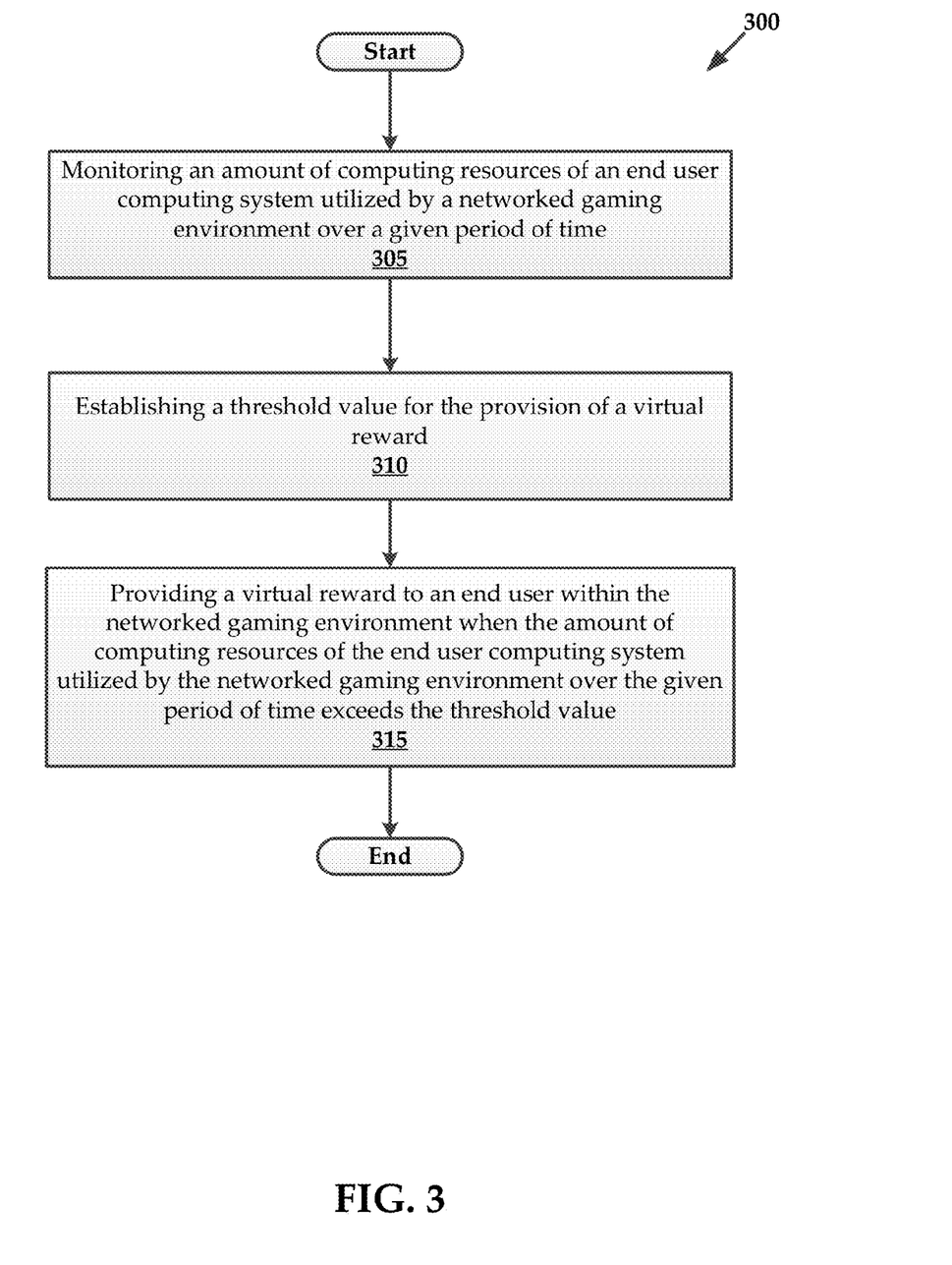
FIG. 3 is a flowchart of another exemplary method for exchanging virtual rewards for computing resources.
Figure 3A:
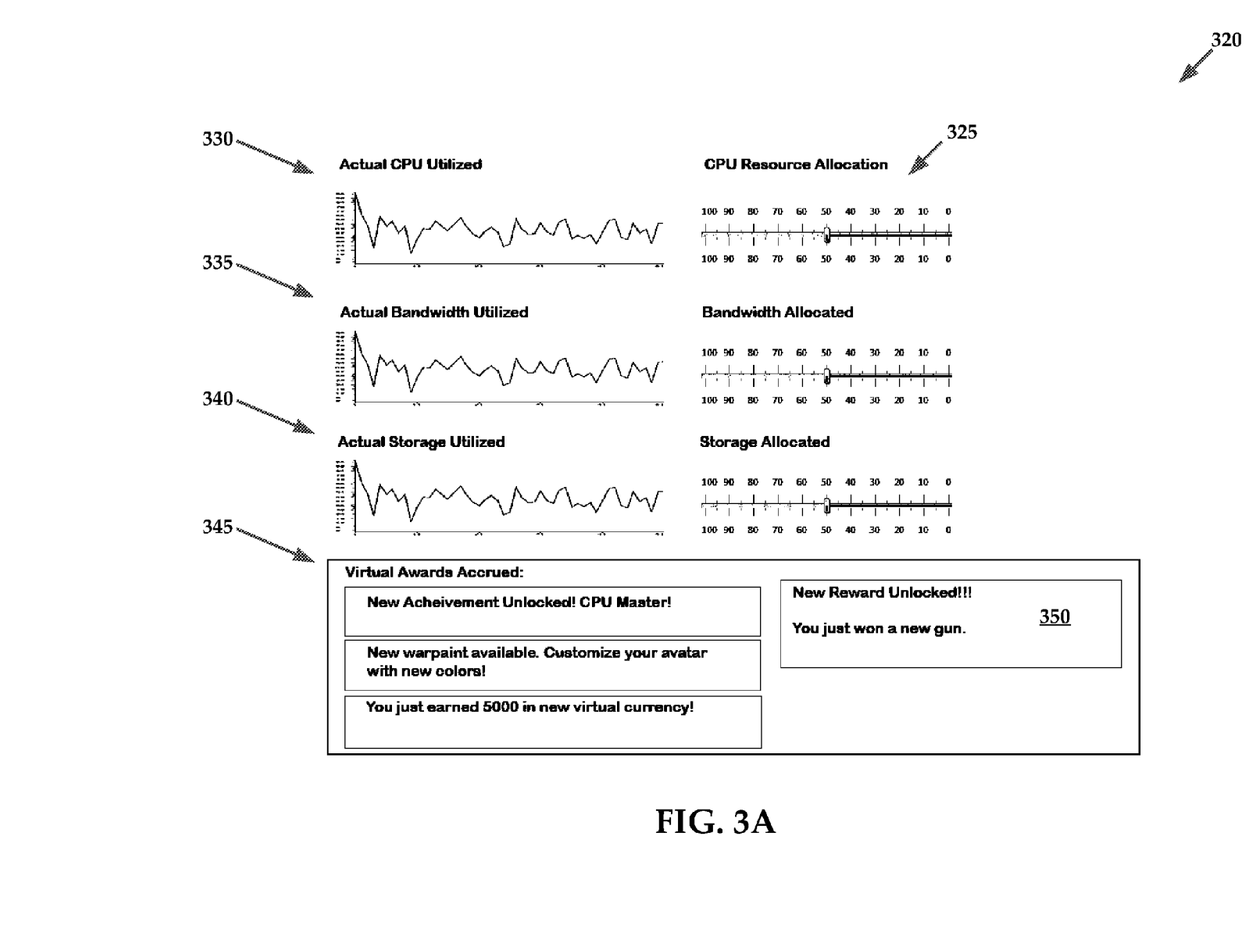
FIG. 3A depicts an exemplary a graphical user interface in the form of a dashboard.

Referring now to FIG. 3A, a graphical user interface in the form of a dashboard 320 is shown. Generally, the dashboard 320 may include, for each computing resource, an indication of how much of the computing resource has been allocated, along with a graphical display of the actual amount of the computing resource that has been used over a given period of time. For example, a CPU resource allocation slider bar can be slidably actuated to vary the amount of CPU resources which are allocated or dedicated. In this example, CPU resource allocation has been set to fifty percent. Disposed proximate the slider bar 325, a graphical representation of Actual CPU Utilized 330 is provided. The graphical representation shows the actual CPU resources of the end user computing system that has been used by the networked gaming system 105. As is shown, the amount of CPU resources that are actually used by the networked gaming system 105 varies over time. Thus, although fifty percent of available CPU resources have been allocated, the amount that is actually used by the networked gaming system 105 may fall somewhere between zero and fifty percent.

Similar slider bars and graphical displays may be used for other computing resources such as Bandwidth and Storage, 335 and 340, respectively.

The dashboard 320 may also comprise a list 345 of virtual rewards that have been provided to the end user. For example, the end user is shown as having unlocked a CPU master achievement, ostensibly for either allocating a particular amount of CPU resources, the use of an amount of CPU resources by the networked gaming system 105, or a combination thereof. Other rewards such as avatar customization and virtual currency may be provided for other types of computing resource allocation/usage. The dashboard 320 may also include a notification 350 that informs the end user that a reward such as a weapon has been provisioned in response to either their allocation and/or usage of allocated resources.

Notifications may also be provided to end users via the dashboard that includes requests for end users to allocate resources. For example, if the network gaming system is in need of additional processing capacity, the dashboard may provide a notification to a plurality of end users requesting that the end users dedicate a portion of their processing capacities to the system. The request may include an indication that a virtual reward is available to end users that allocate the needed resources. In some instances, a selection of virtual rewards may be provided to the end user. Selecting one of the virtual rewards then provides the networked gaming system with access to the requested computing resource of the end user computing system.

According to some embodiments, the resource manager module 135 may monitor the reaction of end users to the provisioning of virtual rewards and adjust the provisioning of virtual rewards based upon such feedback. That is, the resource manager module 135 may tailor the type of virtual reward that is provided to the end user in order to entice or encourage the end user to dedicate a specific type or amount of a computing resource. For example, the resource manager module 135 may determine that end users readily dedicate more processing capacity when a particular virtual reward is provided. Thus, the resource manager module 135 may select the virtual reward based upon such feedback.

Figure 2:
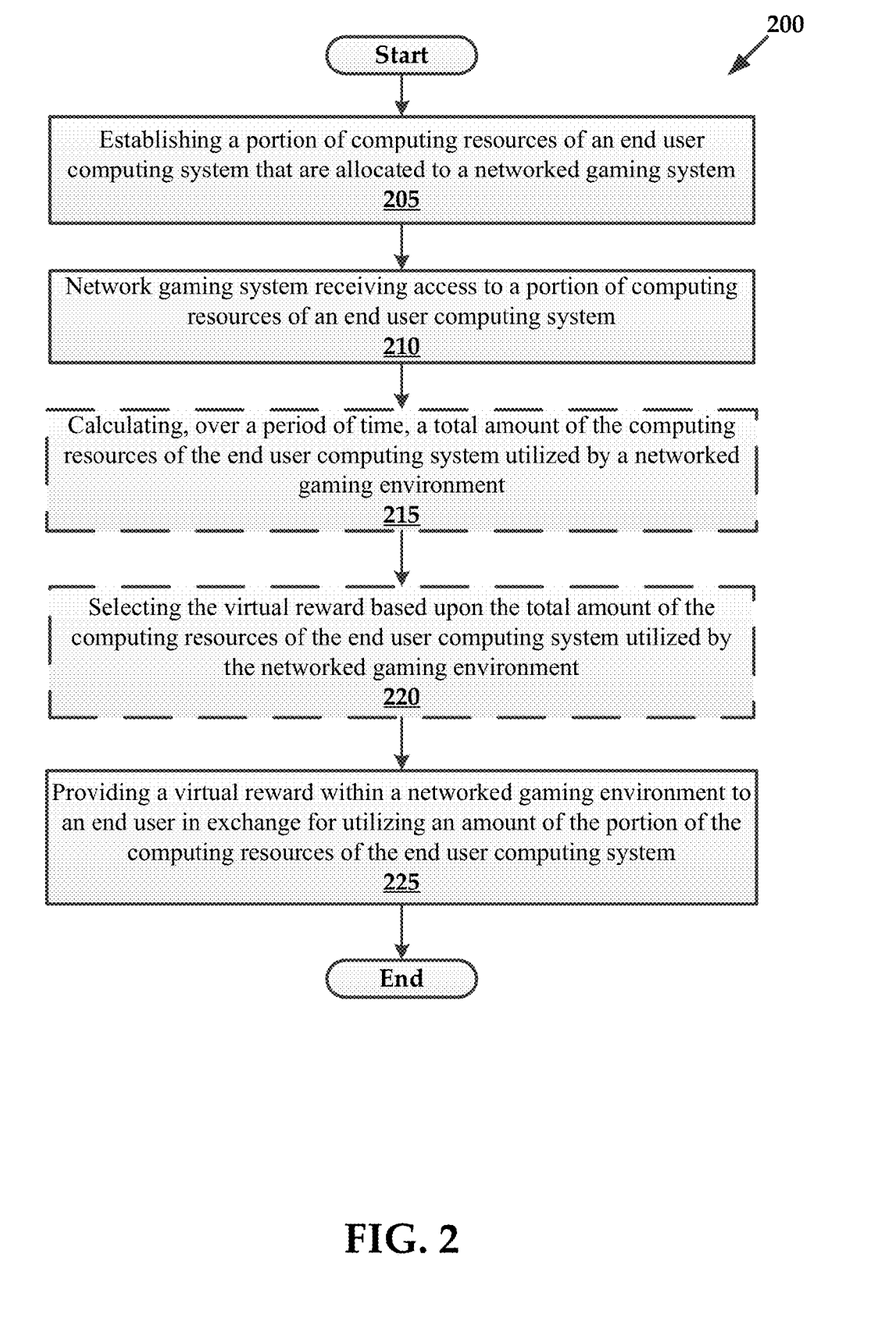
FIG. 2 is a flowchart of an exemplary method for exchanging virtual rewards for computing resources.

FIG. 2 illustrates a flowchart of an exemplary method 200 for exchanging a virtual reward for computing resources. The method 200 may comprise a step 205 of establishing a portion of computing resources of an end user computing system that are allocated to a networked gaming system that facilitates a networked gaming environment. Step 205 may be executed by an end user utilizing a resource allocation application that executes on the end user computing system. The end user may specify which computing resources are to be allocated and an amount of each type of computing resource that is to be allocated. For example, an end user may specify that 5% of the processing capacity of the CPU of the end user computing system is to be allocated, while 20% of the network bandwidth of the end user computing system is to be allocated. Other types of computing resources may also be allocated.

In addition to specifying the type and amount of computing resources that are to be allocated, the end user may also specify time frames that govern when specific computing resources are allocated for use.

Next, the method may comprise a step 210 of the network gaming system receiving access to a portion of computing resources of an end user computing system. This step 210 may comprise the end user computing system establishing a network connection with the network gaming system.

According to some embodiments, the method may comprise an optional step 215 of calculating, over a period of time, a total amount of the computing resources of the end user computing system utilized by a networked gaming environment. Step 215 may be followed by a subsequent optional step 220 of selecting the virtual reward based upon the total amount of the computing resources of the end user computing system utilized by the networked gaming environment.

Regardless of how the virtual reward has been selected, the method may comprise a step 225 of the network gaming system providing a virtual reward within a networked gaming environment to an end user in exchange for utilizing an amount of the portion of the computing resources of the end user computing system.

Again, in some instances, the virtual reward may be provided to the end user upon the end user allocating the computing resources, or alternatively, only after the allocated resources have actually be utilized by the network gaming system.

FIG. 3 illustrates a flowchart of another exemplary method 300 for exchanging a virtual reward for computing resources. According to some embodiments, the method 300 may comprise a step 305 of monitoring an amount of computing resources of an end user computing system utilized by a networked gaming environment over a given period of time. As with the method 200 illustrated in the flowchart of FIG. 2, the end user may specify which computing resources are to be allocated and an amount of each type of computing resource that is to be allocated. For example, an end user may specify that 5% of the processing capacity of the CPU of the end user computing system is to be allocated, while 20% of the network bandwidth of the end user computing system is to be allocated. Other types of computing resources may also be allocated.

In addition to specifying the type and amount of computing resources that are to be allocated, the end user may also specify time frames that govern when specific computing resources are allocated for use.

The method 300 may also include a step 310 of establishing a threshold value for the provision of a virtual reward. For example, a threshold value may established which specifies that a virtual reward is to be provided to an end user when the networked gaming system has utilized 5% of processing capacity of the end user computing system for a total of ten hours. Different threshold values may be established for each type of computing resource. For example, the system may provide a virtual reward upon the network gaming system utilizing at least 20 megabytes of storage space on the end user computing system. According to some embodiments, the threshold value may comprise a series of tiered threshold values. For each tier level of the tiered threshold values, a different virtual reward may be provided to the end user. As the threshold values increase the value (or quantity) of the virtual reward(s) may be increased. For example, a first virtual reward may be provided to the end user when the network gaming system has utilized at least 5% of the processing capacity of the CPU of the end user computing system. A second virtual reward may be provided to the end user when the network gaming system has utilized at least 8% of the processing capacity of the CPU of the end user computing system, and a third virtual reward may be provided to the end user when the network gaming system has utilized at least 10% of the processing capacity of the CPU of the end user computing system. In sum, stepwise increases in allocated processing capacity may result in stepwise provisioning of virtual rewards. Additionally, combinations of allocated computing resources may warrant the provisioning of more valuable virtual rewards to the end user. For example, a virtual reward may be provided to the end user when the end user has allocated an amount of processing capacity along with an amount of network bandwidth. The virtual reward may have a greater value relative to another virtual reward that would have been provided to the end user if the end user had only allocated an amount of network bandwidth.

Next, the method 300 may comprise a step 315 of providing a virtual reward to an end user within the networked gaming environment when the amount of computing resources of the end user computing system utilized by the networked gaming environment over the given period of time exceeds a threshold value.

Figure 4:
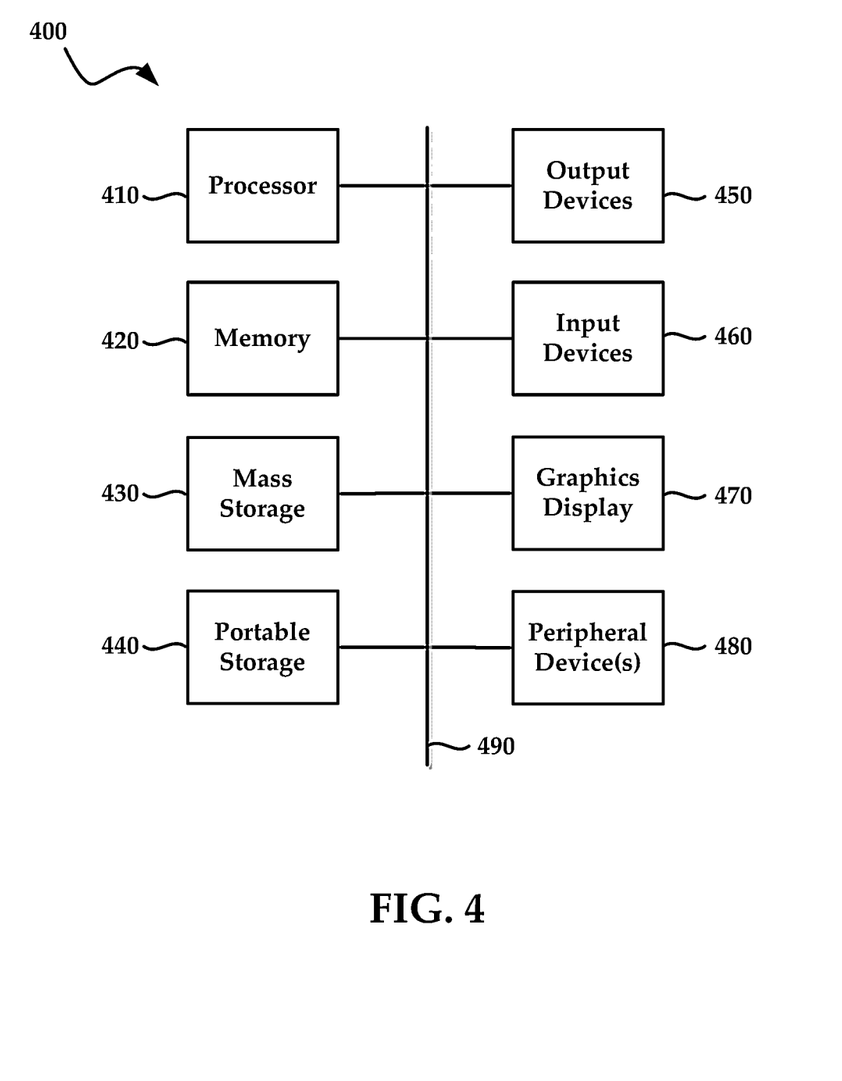
FIG. 4 is a block diagram of an exemplary computing system that may be utilized to practice aspects of the present disclosure.

FIG. 4 illustrates an exemplary computing system 400 that may be used to implement an embodiment of the present technology. Either of the end user computing system 115 and/or the server 110 may include one or more of the components of computing system 400. The computing system 400 of FIG. 4 includes one or more processors 410 and main a memory store 420. Main a memory store 420 stores, in part, instructions and data for execution by processor 410. Main a memory store 420 can store the executable code when the computing system 400 is in operation. The computing system 400 of FIG. 4 may further include a mass storage device 430, portable storage medium drive(s) 440, output devices 450, user input devices 460, a graphics display 470, and other peripheral device(s) 480.

The components shown in FIG. 4 are depicted as being connected via a single bus 490. The components may be connected through one or more data transport means. The one or more processor 410 and main a memory store 420 may be connected via a local microprocessor bus, and the mass storage device 430, peripheral device(s) 480, portable storage medium drive(s) 440, and graphics display 470 may be connected via one or more input/output (I/O) buses.

Mass storage device 430, which may be implemented with a magnetic disk drive or an optical disk drive, is a non-volatile storage device for storing data and instructions for use by processor 410. Mass storage device 430 can store the system software for implementing embodiments of the present technology for purposes of loading that software into main a memory store 420.

Portable storage medium drive(s) 440 operate in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage medium drive(s) 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the computing system 400 as shown in FIG. 4 includes output devices 450. Suitable output devices include speakers, printers, network interfaces, and monitors.

Graphics display 470 may include a liquid crystal display (LCD) or other suitable display device. Graphics display 470 receives textual and graphical information, and processes the information for output to the display device.

Peripheral device(s) 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for exchanging virtual rewards for computing resources, the method comprising:
   implementing a networked gaming environment for a plurality of end users of the networked gaming environment;
   receiving access to a portion of computing resources of an end user computing system of an end user while the end user is interacting with the networked gaming environment, the computing resources for use in implementation of the networked gaming environment; and
   providing a virtual reward when the portion of the computing resource is dedicated for access by the networked gaming environment, the virtual reward provided for use within the networked gaming environment to the end user in exchange for utilizing an amount of the portion of the computing resources of the end user computing system.

2. The method according to claim 1, wherein the computing resources comprises any of processing, memory, network bandwidth, or any combinations thereof.

3. The method according to claim 1, wherein a value of the virtual reward is increased as additional portions of the computing resources are dedicated and utilized.

4. The method according to claim 1, wherein the virtual reward that is provided is also based upon an operating period during which access to the computing resources has been provided.

5. The method according to claim 1, wherein the virtual reward comprises any of virtual currency, virtual items, gaming points, prioritized access to the networked gaming environment, or any combinations thereof.

6. The method according to claim 1, providing to the end user computing system, a visual indication of the amount of the portion of the computing resources of the end user computing system that is being utilized.

7. The method according to claim 6, further comprising providing to the end user computing system, a visual indication that virtual rewards have been provided to the end user.

8. The method according to claim 1, further comprising:
   calculating, over a period of time, a total amount of the computing resources of the end user computing system utilized by a networked gaming environment; and
   selecting the virtual reward based upon the total amount of the computing resources of the end user computing system utilized by the networked gaming environment.

9. A method for exchanging virtual rewards for computing resources, the method comprising:
   monitoring an amount of computing resources of an end user computing system utilized by a networked gaming environment over a given period of time; and
   providing a virtual reward to an end user within the networked gaming environment when the amount of computing resources of the end user computing system utilized by the networked gaming environment over the given period of time exceeds a threshold value and when a portion of the computing resource is dedicated for access by the networked gaming environment.

10. The method according to claim 9, wherein a value of the virtual reward is proportional to the amount of computing resources of the end user computing system utilized by the networked gaming environment.

11. The method according to claim 9, wherein the virtual reward that is provided to the end user is based upon a type of computing resource that is provided to the networked gaming environment by the end user computing system.

12. An online gaming system that facilitates a networked gaming environment, the online gaming system comprising:
   at least one server that is selectively coupleable to an end user computing system, the at least one server comprising a processor configured to execute instructions that comprise:
      a resource manager that receives access to a portion of computing resources of the end user computing system for use in the networked gaming environment; and
      a reward module that provides a virtual reward within the networked gaming environment to an end user in exchange for an amount of the portion of computing resources of the end user computing system that is utilized to facilitate operation of the networked gaming environment, the virtual reward being provided when the portion of the computing resource is dedicated for access by the networked gaming environment.

13. The system according to claim 12, wherein the computing resources comprises any of processing, memory, network bandwidth, or any combinations thereof.

14. The system according to claim 12, wherein a value of the virtual reward that is provided by the reward module is increased as additional portions of the computing resources are utilized by the resource manager.

15. The system according to claim 12, wherein the virtual reward that is provided is also based upon an operating period during which access to the computing resources has been provided.

16. The system according to claim 12, wherein the virtual reward comprises any of virtual currency, virtual items, gaming points, prioritized access to the networked gaming environment, or any combinations thereof.

17. The system according to claim 12, wherein the reward module further:
   calculates, over a period of time, a total amount of the computing resources of the end user computing system utilized by the networked gaming environment; and
   selects the virtual reward based upon the total amount of the computing resources of the end user computing system utilized by the networked gaming environment.

* * * * *